(12) United States Patent
Kayser et al.

(10) Patent No.: US 6,464,834 B2
(45) Date of Patent: Oct. 15, 2002

(54) CALENDER ROLL AND PROCESS FOR OPERATING A CALENDER ROLL

(75) Inventors: Franz Kayser, Geldern (DE); Erich Kläui, Seuzach (CH)

(73) Assignee: Voith Paper Patent GmbH, Heidenheim (DE)

( * ) Notice: Subject to any disclaimer, the term of this patent is extended or adjusted under 35 U.S.C. 154(b) by 0 days.

(21) Appl. No.: 09/790,687

(22) Filed: Feb. 23, 2001

(65) Prior Publication Data

US 2002/0060021 A1 May 23, 2002

(30) Foreign Application Priority Data

Feb. 25, 2000 (DE) .......................... 100 08 800

(51) Int. Cl.⁷ .................... D21G 1/02; D21G 7/00; B30B 3/04
(52) U.S. Cl. ................ 162/198; 100/155 R; 492/20
(58) Field of Search ............... 162/198, 199, 162/204, 205, 252, 263, 272, 358.1; 100/35, 162 R, 162 B, 163 A, 164; 700/127, 128, 129; 492/7, 16, 8, 20

(56) References Cited

U.S. PATENT DOCUMENTS

| | | | |
|---|---|---|---|
| 3,266,414 A | | 8/1966 | Wahlstorm et al. |
| 3,456,582 A | * | 7/1969 | McClenathan ............. 100/155 |
| 4,290,353 A | * | 9/1981 | Pav et al. ................ 100/162 B |
| 4,546,425 A | * | 10/1985 | Breitzholtz .................. 364/153 |
| 4,943,224 A | * | 7/1990 | Nied et al. ............. 425/174.8 R |
| 5,768,985 A | * | 6/1998 | Lehtovirta et al. ............. 100/38 |
| 5,821,498 A | * | 10/1998 | Niskanen et al. ........... 219/469 |
| 5,961,899 A | | 10/1999 | Rossetti et al. ............. 264/40.1 |
| 6,156,158 A | | 12/2000 | Kusterman ................... 162/198 |
| 1,000,065 A1 | | 3/2001 | Kusterman |

FOREIGN PATENT DOCUMENTS

| | | |
|---|---|---|
| DE | 19652769 | 6/1998 |
| WO | 99/04181 | 1/1999 |
| WO | WO 00/05450 * | 2/2000 ............ D21G/1/00 |

OTHER PUBLICATIONS

US 2001/0003112 06–2001 United States Patent Application Publication Kirchner 492/16.*

* cited by examiner

*Primary Examiner*—Peter Chin
*Assistant Examiner*—Eric Hug
(74) *Attorney, Agent, or Firm*—Greenblum & Bernstein, P.L.C.

(57) ABSTRACT

A process is provided for operating a calender roll including a roll jacket surrounding an inner chamber. The process includes creating an active oscillation in the inner chamber that acts upon the roll jacket. By creating an oscillation within the calender roll, the appearance of undesired bar rings, which form on the external surface of the roll jacket due to operational exciting forces, is avoided. Furthermore, calender roll is provided including a roll jacket surrounding an inner chamber, and at least one actuator provided within said inner chamber acting upon said roll jacket.

34 Claims, 2 Drawing Sheets

CALENDER ROLL AND PROCESS FOR OPERATING A CALENDER ROLL

CROSS-REFERENCE TO RELATED APPLICATIONS

The present application claims priority under 35 U.S.C. § 119 of German Patent Application No. 100 08 800.7, filed on Feb. 25, 2000, the disclosure of which is expressly incorporated by reference herein in its entirety.

BACKGROUND OF THE INVENTION

1. Field of the Invention

The present invention relates to a calender roll having a roll jacket that surrounds an inner chamber. Furthermore, the invention relates to a process for operating the calender roll having a roll jacket that surrounds an inner chamber.

2. Discussion of Background Information

Such calender rolls are frequently used as center rolls in a calender, thus forming a part of a roll stack. Here, neighboring rolls form nips, through which a material web is guided in order to be exposed to an increased pressure or perhaps an increased temperature.

Such rolls are widely used for the processing of a paper web which in the following is used as the example for describing the invention. However, the same problems occur with other material webs as well.

In such calenders, usually so-called "soft" rolls cooperate with "hard" rolls. Sporadically, two "soft" rolls cooperate. Here, the soft rolls are covered with a plastic cover. It has been observed that after a certain duration of operation a so-called bar ring can be observed. This bar ring appearance causes, on the one hand, an undesired lined pattern on the paper web. However, these lines are also discernible as lineshaped markings on the elastic rolls with the plastic covers. The soft rolls become multi-angular, so to speak. A certain depth and intensity on these bar rings leads to rejections in the paper web. Then the correlating roll or the correlating rolls must be reworked in order to remove the deformation of the plastic cover. This is generally done by turning the roll off on the lathe.

SUMMARY OF THE INVENTION

The invention is based on the aspect of avoiding the appearance of bar rings. This aspect is attained in a process of the type described at the outset such that an active oscillation is created in the inner chamber that affects the roll jacket.

A roll stack formed from several rolls has a multitude of natural frequencies. Among these natural frequencies there are, for instance, natural sagging frequencies that are of lesser interest in the present case, and forms of natural oscillations that result from the oscillating roll masses on the spring and damper systems that are formed by the plastic covers positioned between the rolls and also by the roll bearings. An operating calender creates exciting forces whose frequencies are dependent on the roll rotations and are equivalent to a multiple of the rotation frequency in the first feeding. These exciting forces can have many causes, for instance, inhomogeneities, anisotropies, or geometric faults. Also, variations in paper thickness of the paper web traveling through the calender can excite the roll stack. When one of these exciter frequencies meets one of the natural frequencies the oscillating system reacts with increased oscillation amplitudes. Due to the multitude of possible forms of natural oscillations these resonance points are practically unavoidable in the construction.

Generally, the oscillation system is dampened to such an extent and the exciter forces are so small that the resulting oscillating motion is not immediately disturbing. Over a more or less long duration, however, these oscillating motions imprint the plastic cover of the elastic roll. Frequently it can be observed that the nearest integral multiple of the oscillation frequency is imprinted onto the roll as a pattern. Thus, a feedback of the oscillation occurs. The oscillation amplitudes then rise exponentially. They are expressed, on the one hand, by an increased sound level (up to more than 115 dB (A)) and, on the other hand, in periodical thickness variations of the paper web passing through which lead to rejections, as mentioned above.

According to the invention, the feedback effect of the creating mechanism of the periodic cover waviness is disturbed in order to prevent the above-described feedback. In order to avoid that an even integral pattern with a frequency close to the natural frequency of the system is imprinted onto the rolls, an oscillation that feeds back to the roll jacket is actively created in the inner chamber of the calender roll. In addition to the oscillations at the calender that can be observed at the roll jacket during operation, the roll jacket is caused to oscillate as well. This results in a common oscillation behavior of a single roll in which, in the ideal case, the oscillations excited from the calender are eliminated by the active oscillation created in the inner chamber of the calender roll. Frequently, this can only be achieved with difficulties in practical use. Therefore, it will frequently be sufficient to control the active oscillation such that the resulting oscillation of the calender roll does not result in a bar ring formation.

Here, it is preferred that a resulting oscillation is determined at the roll jacket and the active oscillation is controlled dependent on the resulting oscillation, i.e., an active oscillation is created in a control circuit that is designed such that the resulting oscillation is as small as possible.

Preferably, the frequency and/or the phase of the active oscillation is modified during operation. It can, for instance, be provided that the frequency and/or phase of the active oscillation is modified from time to time or continuously. To express it even more generally, the spectral parts of the active oscillation can be modified during operation with regard to their amplitudes, frequencies and/or phases. This causes the surface of the plastic cover to deform so that the impression of bar rings or the multi angularity can be avoided.

Preferably, the active oscillation is directed essentially in the pressing direction of the roll. This is the direction from which the strongest influence for the formation of bar rings is to be expected according to present knowledge. When the active oscillation of the exciter oscillation counteracts here, its impact is the largest.

This aspect is attained in a calender roll of the above-mentioned type such that at least one actuator effecting the roll jacket is provided in the inner chamber. Such an actuator can impose an oscillation onto the roll jacket. This oscillation is then the above-mentioned "active oscillation." The oscillation caused by external exciters and the oscillation of the roll jacket caused by the actuator result then in a common oscillation that can be formed by a corresponding control of the actuator such that the formation of bar rings is avoided or at least reduced.

Here, it is preferred to position the actuator between an inertia mass and the roll jacket. This increases the effectiveness of the actuator. For example, the actuator can be embodied such that it enlarges or reduces the distance between the inertia mass and the roll jacket which requires a shifting of the inertia mass. In this case, due to the inertia of the inertia mass a reaction force develops at the roll jacket that can be used for the creation of an active oscillation.

Preferably, several actuators are distributed over the axial length of the roll jacket. This is due to the fact that many roll jackets are flexible to the extent that an impulse of an actuator positioned in the middle is not necessarily sufficient in order to make the correlating active oscillation reach to the edge strips of the roll. When several actuators are distributed in the axial direction it can be ensured that the calender roll is excited over its entire axial length. Such embodiments are certainly preferred in which all such actuators are operated in a synchronized manner or at least by the same means.

Preferably, at least two actuators, impacting perpendicular to the roll axis and being positioned essentially at the same axial position, are combined to a group. This results easily in the ability to influence the direction of the exciting. Each actuator creates a reaction force onto the roll jacket independently from the other ones of the same group. The combined force results then in the net force of the reaction forces.

Here, it is particularly preferred to position the actuators belonging to the same group rotationally symmetrical around the roll axis. In this case, at least two dual acting actuators or three single acting actuators are necessary. Then, essentially, any direction of oscillation can be adjusted without losing the symmetry inside of the roll.

In the roll jacket a sensor arrangement is provided, preferably, that is connected to a control device that controls at least one actuator. With the aid of the sensor arrangement the oscillations effecting the roll jacket can be measured. Since the sensor arrangement is also positioned in the inner chamber the oscillation can even be measured reliably when the roll contacts another roll during operation and particularly in the area where the oscillations to be expected are the largest, therefore no construction space for sensors is available on the outside. However, in the interior of the roll, space is available that can be used for the positioning of the sensor arrangement. This is additionally advantageous for detecting the oscillations of the roll practically at the position where also the counter oscillations are created by the actuators.

Preferably, the control device is provided with a rotation entry and/or a rotation angle entry. With it the rotation or the rotation angle of the roll can be taken into account for the creation of the active oscillations by the actuators. This improves the reacting behavior of the control device.

In a preferred embodiment the actuators are provided with electromagnets. Electromagnets are easily controlled. They can operate with relatively high frequencies of about 400 to 800 Hz and cause correlating oscillations in the roll jacket.

In a particularly preferred embodiment it is provided for the actuator to rotate together with the roll jacket. In this case, there is a permanent coupling of the actuator with the roll jacket, thus no bearing needs to be provided between the actuator and the roll jacket. By controlling the actuator or actuators accordingly even in a rotating actuator it can be ensured that the oscillation is pointed in the desired direction.

Preferably, an electrical energy transmission device is provided at the end of the roll jacket. With the aid of the energy transmission device the energy necessary for operating the actuators is transmitted from the outside into the inside of the roll. In one case, the electrical energy can directly affect the actuators. However, it is also possible to provide another electromagnetic transmission and to drive the actuators hydraulically or pneumatically, for instance, when an electric motor for driving a pump is positioned inside of the roll. For the sake of simplicity, however, the following is conditioned in the actuators being driven electrically.

Here, it is preferred that the electric energy transmission device is provided with a slip ring arrangement. A slip ring arrangement forms slipping contacts over which the electric current can be guided into the interior of the roll using a certain voltage. This is a very simple and proven embodiment.

In an alternative embodiment the electric energy transmission device can be provided with an inductive coupling. Thus, this is a transformer with a stationary part and a part rotating together with the roll. Through such an inductive transmission electric energy can also be brought into the interior of the roll. Here, it must be considered that the energy required for the actuators is not very high. It is in the range of Kilowatts so that relatively compact slip ring arrangements or transformer arrangements are sufficient to transmit sufficient electric power.

Preferably, a modulation device is provided between the energy transmission device and an energy providing device that feeds a signal into the transmitted electric energy. Here, modulation is regarded in the sense of providing the current or the voltage that is transmitted into the interior of the roll with information that can be used for controlling the actuators. This modulation can occur in many ways. For example, a multiplexer can be used that transmits signals and power in subsequent periods. It is also possible to "add" a correspondingly higher frequenced signal of the type of carrier frequency modulation onto the electric power when it is transmitted with the aid of direct current or with the aid of a low-frequency alternating current.

In an alternative embodiment it can be provided that a generator is provided in the roll jacket that is driven by the rotation of the roll. This generator can be an electric generator or an electric or pneumatic pump. In this case, however, a slightly higher driving power is necessary for the roll. The energy necessary for driving the actuators can also be received without any additional energy transmission device from the outside towards the inside.

Preferably, the roll jacket is provided in the area of each actuator with a cage-like support structure. Here, the actuator does not need to impact the roll jacket immediately, perhaps being faced by a warped or concave area. It can act onto the support structure which then transmits the reaction forces onto the roll jacket.

According to an aspect of the present invention, a process for operating a calender roll including a roll jacket surrounding an inner chamber is provided. The process includes creating an active oscillation in the inner chamber that acts upon the roll jacket. According to another aspect of the present invention, the process further includes determining a resulting oscillation at the roll jacket; and controlling the active oscillation depending on the resulting oscillation.

Additionally, other aspects of the present invention include modifying the active oscillation is during operation with regard to at least one of amplitude, frequency, and phase. In yet another aspect of the present invention, at least one of the frequency and the phase of the active oscillation varies during operation. In another aspect of the present invention, the active oscillation is modified during operation. In another aspect of the present invention, the active oscillation is modified continuously during operation.

According to a further aspect of the present invention, the active oscillation is directed in the press direction of the roll.

In another aspect of the present invention, a calender is provided including a roll jacket surrounding an inner chamber, and at least one actuator provided within the inner chamber acting upon the roll jacket. According to a further aspect of the present invention, the actuator is positioned between an inertia mass and an inside surface of the roll jacket. In another aspect of the invention, the said at least one actuator includes a plurality of actuators distributed substantially over an entire axial length of the roll jacket.

According to a still further aspect of the present invention, at least two actuators which act perpendicular to an axis of the calender roll, are positioned at a same axial position and are grouped together. Other aspects of the invention, include positioning the at least two actuators radially symmetrically around the axis of the calender roll.

Further aspects of the present invention include a sensor arrangement provided inside the roll jacket that is connected to a control device that controls at least one actuator. According to still other aspects of the present invention, the control device is provided with at least one of a rotation entry and a rotation angle entry. According to another aspect of the present invention, the at least one actuator is provided with at least one electromagnet.

According to still another aspect of the invention, the said at least one actuator rotates together with the roll jacket. According to another aspect of the present invention, an electric energy transmission device provided at an end of the roll jacket. Additionally, other aspects of the present invention include the electric energy transmission device is provided with a slip ring arrangement. In yet another aspect of the present invention, a performance enhancer which controls the at least one actuator is provided.

In another aspect of the present invention, the electric energy transmission device is provided with an inductive coupling. According to a further aspect of the present invention, a modulation device is provided, connected between the energy transmission device and an energy supply device, that inserts a signal into electric energy from the energy supply device.

According to another aspect of the present invention, the modulation device includes a multiplexer and de-multiplexer. Additionally, other aspects of the present invention include a generator that is provided within the roll jacket that is driven by rotation of the calender roll. In yet another aspect of the present invention, a cage structure provided within the inner chamber of the roll jacket to provide support in the area of the at least one actuator is included.

In another aspect of the present invention, the cage structure include four plates forming a centric positioned square supported at an inner wall of the roll jacket. According to a still further aspect of the present invention, at the center of the centric positioned square, an inertia mass is provided onto which four actuators are provided. According to a still further aspect of the present invention, the four actuators include electromagnets.

In another aspect of the present invention, each electromagnet includes an E-shaped yoke, having a plurality of arms, with a reel being positioned around a center arm of the E-shaped yoke. According to a still further aspect of the present invention, the plurality of arms of the yoke, together with the cage arrangement, form a gap. Other aspects of the present invention include a speedometer. Further aspects of the present invention include a signal processor to gather information with respect to the rotational angle of the calender roll.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
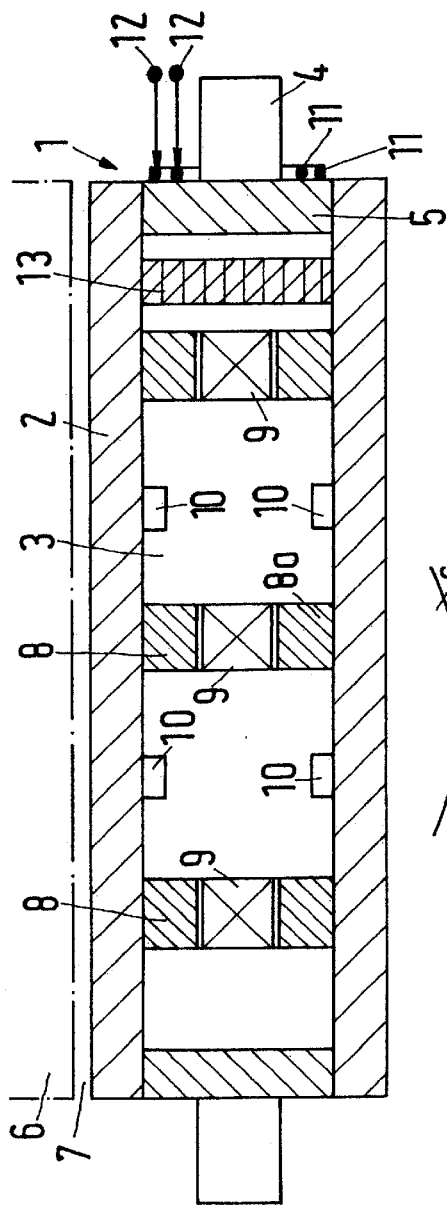
FIG. 1 a lengthwise section through a first embodiment of a roll.

FIG. 1 depicts a lengthwise section through a calender roll 1 with a roll jacket 2 that surrounds an inner chamber 3. Further, the calender roll 1 is provided with roll pins 4 that are connected with pin discs 5 that seal the inner chamber 3 at the faces. The presence of roll pins 4 and pin discs 5, however, is not mandatory.

The operation of the calender roll 1 cooperates with at least one mating roll 6 depicted in dot-dash lines. Between the calender roll 1 and the mating roll 6 a nip 7 is formed through which a material web, for example a paper web, can be guided in order to be exposed to an increased pressure and/or perhaps an increased temperature. If necessary, the mating roll 6 is heated. The roll jacket 2 can also be provided on its exterior circumference with a plastic cover, not depicted in detail, so that the calender roll 1 is embodied as an elastic or "soft" roll.

When a calender roll 1 cooperates during operation with a mating roll 6 in order to glaze a material web, not depicted in detail, the axes of the two rolls are positioned in a so-called press plane 24 (FIG. 2) that in the present exemplary embodiment of FIG. 1 is identical with the drawing level.

In the inner chamber 3 several actuators 8 are positioned equally distributed in the axial direction. In the exemplary embodiment of FIG. 1 the actuators can be shifted lengthwise. They are fixed on one end to the roll jacket 2. At the other end, they are connected with an inertia mass 9. Therefore, when an actuator 8 is operated a shortening or lengthening of the distance between the inertia mass 9 and the roll jacket 2 occurs. Since a certain amount of force is necessary for shifting the inertia mass 9 the correlating counter force or reaction force acts onto the roll jacket 2. By a periodic activation of the actuators 8 it is therefore possible to set the roll jacket 2 into oscillation from the interior.

The inner chamber 3 is additionally provided with sensors 10 that determine the oscillations of the roll jacket 2. With a control device not depicted in detail in Fig. 1 and 2 the actuators 8 can be controlled such that the oscillations detected by the sensors 10 can be kept as small as possible or be eliminated. When the roll jacket 2 no longer oscillates, the danger of a formation of bar rings reduces drastically.

In some cases, it will be possible only with difficulties to completely eliminate an oscillation of the roll jacket 2. In this case, alternatively to the elimination of the oscillation it can be provided that the frequency with which the actuator is operated (here, certainly frequencies between about 100 and 1000 Hz) are modified during operation in intervals or continuously so that the resulting oscillation of the roll jacket 2 is not consistent long enough in one frequency to allow the formation of bar rings.

The actuators can be embodied as electromagnets. Electromagnets are provided with electric current at a predetermined voltage via two slip rings 11. Here, the slip rings can be positioned at the facial side of the calender roll 1. They are fed through the contacts 12. Further, in the inner chamber 3 of the roll jacket 2 a performance enhancer 13 can be provided, if necessary with a control device, which ultimately controls the actuators 8 in the desired manner.

Instead of slip rings, a rotating transformer can be provided as well in which the electric power is transmitted inductively. Finally, it is also possible to provide an electric generator of a pump for air or a hydraulic fluid at the roll jacket 2 or at the pin discs 5, driven by the rotation of the calender roll 1.

The actuators can impact on the level of the drawing, as depicted. When the actuators rotate, thus, when the actuators are connected to the roll jacket 2, they can be controlled, for example, in performing the shifting of the inertia mass 9 only when the motion direction of the inertia mass is in the press level. Additionally, actuators acting perpendicularly to the drawing level can be used so that the inertia mass can be shifted more frequently to produce counter oscillations accordingly.

In an alternative embodiment the depicted actuator arrangement is sufficient in which the dual acting actuators 8, 8a are provided in the press level when the actuators are not rotating. In this case, however, the oscillation of the roll jacket is only effective in the most simple fashion by pressure motions of the actuators (enlarging the active actuators with removal of the inertia mass 9). In an alternative embodiment the actuators can magnetically create tensile forces, for example, at the roll jacket. In this case, the roll jacket 2 slips onto the actuators 8, 8a and the actuators 8, 8a are fixed, for example, to a stand in a manner not depicted in detail in relation to a spatially fixed point. However, a stand is not necessarily mandatory when other means are provided. Actuators 8, 8a can be "fixed" with the aid of a gravity pendulum or a rotary field circulating in the opposite direction of the roll.

Figure 2:
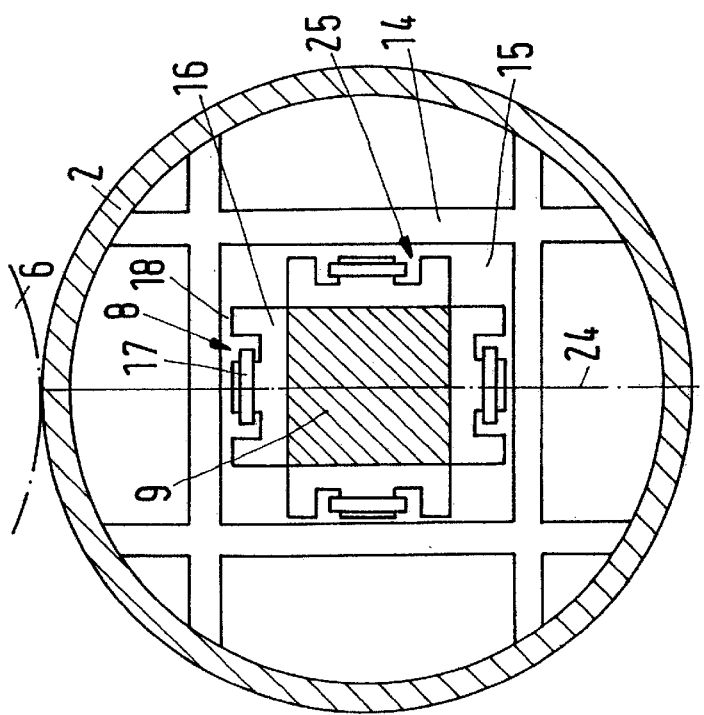
FIG. 2 a cross section through a modified embodiment of a roll.

FIG. 2 depicts a modified embodiment in which equal parts are provided with the same reference characters. Into the roll jacket 2 that cooperates with the mating roll 6, a cage-like support structure 14 is inserted that is formed by four plates forming a centric positioned square 15 and being otherwise supported at the inner wall of the roll jacket 2. In the center of the square 15 an inertia mass 9 is provided onto which four actuators 8 are provided that are formed as electromagnets. Each electromagnet is provided with an E-shaped yoke with a winding 17 being positioned around its center digit. The arms of the yoke together with the cage arrangement 14 form the air gap 18. When the reel is provided with power the electromagnet pulls the inertia mass 9 closer to the correlating side of the cage arrangement 14 or pushes it away accordingly. This way an oscillation can be transmitted to the roll jacket 2 as well.

When the separate actuators are addressed together the direction of the resulting force can be modified. For instance, when the actuator pointing upward in FIG. 2 and the one pointing to the right in FIG. 2 are addressed simultaneously and with equal intensity, a force results that impacts at an angle of 45° onto the roll jacket 2. When the actuators are addressed at off-set phases a force vector can be created that rotates relatively to the roll jacket 2. In the present exemplary embodiment with four actuators 8 that are equally distributed in a circumferential direction and that are grouped together in an actuating group, such a rotating force provision can be achieved, for instance, such that the separate actuators are impacted by sinusoidal alternating currents that are each electrically stacked by 90°.

This effect can be utilized advantageously when the roll jacket 2 rotates. By controlling the actuators accordingly it can be ensured that the resulting force vector remains withing the press level. In an embodiment according to FIG. 2 the correlating oscillation sensors can certainly be provided as well.

Figure 3:
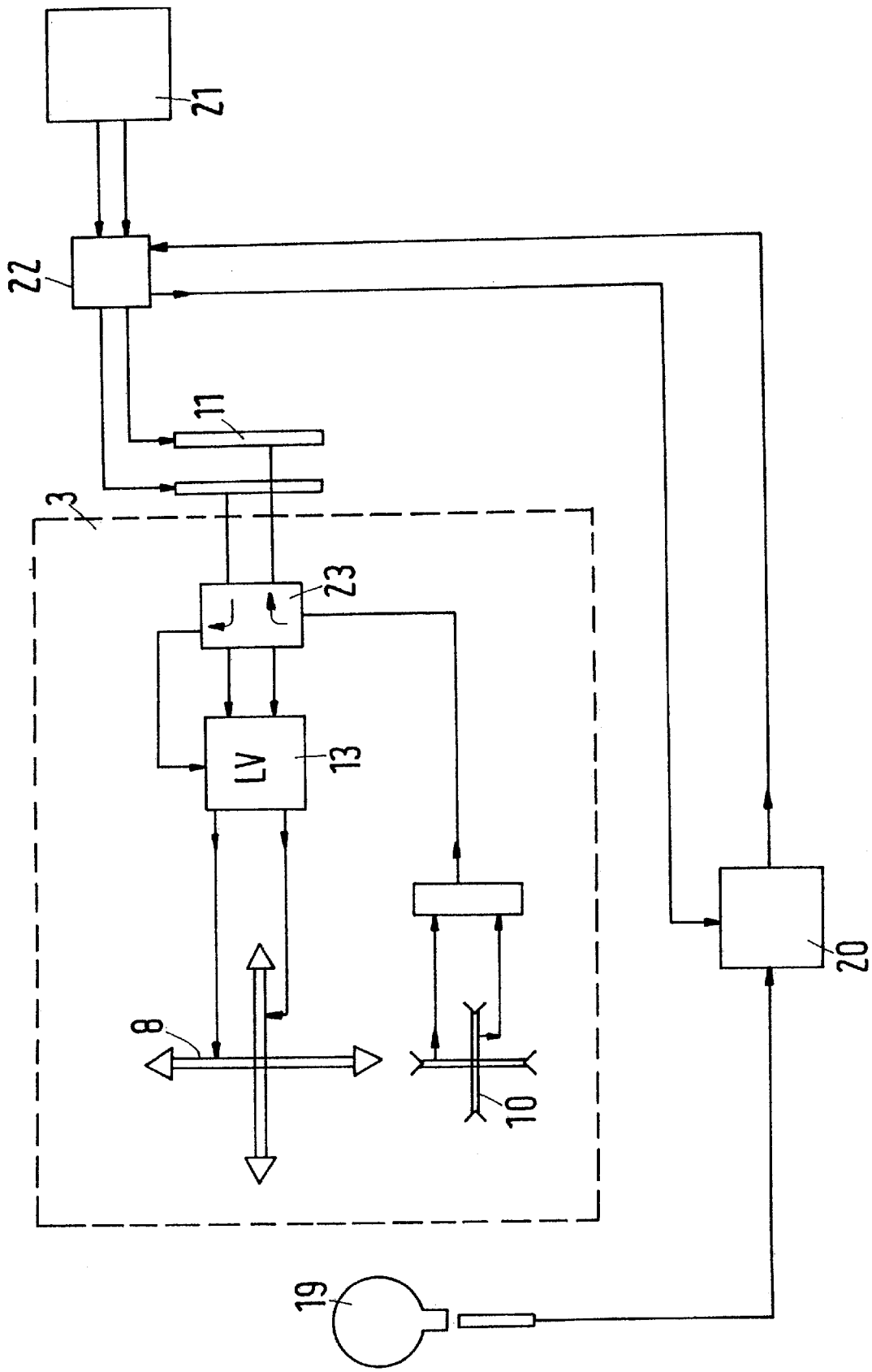
FIG. 3 a schematic control arrangement for describing the operation of the roll.

FIG. 3 shows schematically in the form of a diagram how the actuators 8 are controlled. The actuators are here depicted in the shape of double arrows. The inner chamber 3 is limited by an interrupted line. The calender roll 1 is provided with a speedometer 19 that creates information concerning the rotation. Additionally, in a signal processor 20 information can also be gathered about the correlating rotational angle of the roll.

A power supply device 21 feeds via the slip rings 11 the performance enhancer 13 which again controls the actuators 8. Between the power supply device 21 and the slip rings 11 a modulation device is provided which, in the present case, is embodied as a multiplexer/de-multiplexer. The modulation device 22 prints the signals coming from the processor 20 onto the electric current being transmitted by the slip rings 11. A corresponding demodulation device 23 is provided in the interior 3. The demodulation device 23 is embodied as a multiplexer/de-multiplexer as well. It is also capable of delivering signals originating from the sensor arrangement 10 via the multiplexer 22 to the processor 20.

Certainly, other preferably contact free ways of transmission are possible, for instance, infrared, high frequency, etc. Thus, the processor 20 is capable of controlling the actuator 8 such that the oscillations of the roll jacket 2 are either almost eliminated or the oscillations of the roll jacket 2 are not long enough within one frequency to allow the formation of bar rings.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A process for operating a calender roll including a roll jacket surrounding an inner chamber, the process comprising:

creating, with a rotatable actuator within the inner chamber, an active mechanical oscillation in the inner chamber that acts upon the roll jacket.

2. The process according to claim 1, wherein the active oscillation is directed in the press direction of the roll.

3. A process for operating a calender roll including a roll Jacket surrounding an inner chamber, the process comprising:

creating an active mechanical oscillation in the inner chamber that acts upon the roll jacket;

determining a resulting oscillation at the roll jacket; and controlling the active oscillation depending on the resulting oscillation.

4. The process according to claim 3, wherein the active oscillation is modified during operation with regard to at least one of amplitude, frequency, and phase.

5. The process according to claim 4, wherein at least one of the frequency and the phase of the active oscillation varies during operation.

6. The process according to claim 5, wherein the active oscillation is modified during operation.

7. The process according to claim 5, wherein the active oscillation is modified continuously during operation.

8. A process for operating a calender roll including a roll jacket surrounding an inner chamber, the process comprising:

creating an active mechanical oscillation in the inner chamber that acts upon the roll jacket;

determining a resulting oscillation of the roll jacket; and controlling the active mechanical oscillation depending on the resulting oscillation.

9. The process according to claim 8, further comprising:

recording the resulting oscillation of the roll jacket at least one bearing end of the roll jacket.

10. The process according to claim 8, further comprising:

recording the resulting oscillation of the roll jacket with a vibration pick-up located at least one bearing end of the roll jacket.

11. A calender roll, comprising:

a roll jacket surrounding an inner chamber; and at least one actuator rotatably located within said inner chamber that is arranged to create an active mechanical oscillation to act upon said roll jacket.

12. The calender roll according to claim 11, wherein said actuator is positioned between an inertia mass and an inside surface of said roll jacket.

13. The calender roll according to claim 11, wherein said at least one actuator comprises a plurality of actuators distributed substantially over an entire axial length of said roll jacket.

14. The calender roll according to claim 11, wherein at least two actuators which act perpendicular to an axis of said calender roll, are positioned at a same axial position and are grouped together.

15. The calender roll according to claim 14, wherein said at least two actuators are radially positioned symmetrically around the axis of said calender roll.

16. The calender roll according to claim 11, further comprising a sensor arrangement provided inside said roll jacket that is connected to a control device that controls at least one actuator.

17. The calender roll according to claim 16, wherein said control device is provided with at least one of a rotation entry and a rotation angle entry.

18. The calender roll according to claim 15, wherein said at least one actuator rotates together with said roll jacket.

19. The calender roll according to claim 11, further comprising an electric energy transmission device provided at an end of said roll jacket.

20. The calender roll according to claim 19, wherein said electric energy transmission device is provided with a slip ring arrangement.

21. The calender roll according to claim 20, further comprising a performance enhancer which controls said at least one actuator.

22. The calender roll according to claim 19, wherein said electric energy transmission device is provided with an inductive coupling.

23. A calender roll comprising:

a roll jacket surrounding an inner chamber, and at least one actuator provided within said inner chamber structured and arranged to create a mechanical oscillation to act upon said roll jacket, wherein said at least one actuator is provided with at least one electromagnet.

24. A calender roll comprising:

a roll jacket surrounding an inner chamber;

at least one actuator provided within said inner chamber structured and arranged to create a mechanical oscillation to act upon said roll jacket;

an electric energy transmission device provided at an end of said roll jacket; and a modulation device, connected between said energy transmission device and an energy supply device, that inserts a signal into electric energy from said energy supply device.

25. The calender roll according to claim 24, wherein said modulation device comprises a multiplexer and de-multiplexer.

26. A calender roll comprising:

a roll jacket surrounding an inner chamber;

at least one actuator provided within said inner chamber structured and arranged to create a mechanical oscillation to act upon said roll jacket; and a generator that is provided within said roll jacket that is driven by rotation of said calender roll.

27. A calender roll comprising:

a roll jacket surrounding an inner chamber;

at least one actuator provided within said inner chamber structured and arranged to create a mechanical oscillation to act upon said roll jacket; and a cage structure provided within said inner chamber of said roll jacket to provide support in the area of said at least one actuator.

28. The calender roll according to claim 27, wherein said cage structure comprises four plates forming a centric positioned square supported at an inner wall of said roll jacket.

29. The calender roll according to claim 28, wherein in a center of said centric positioned square, an inertia mass is provided onto which four actuators are provided.

30. The calender roll according to claim 29, wherein said four actuators comprises electromagnets.

31. The calender roll according to claim 30, wherein each electromagnet comprises an E-shaped yoke, having a plurality of arms, with a reel being positioned around a center arm of said E-shaped yoke.

32. The calender roll according to claim 31, wherein said plurality of arms of said yoke, together with said cage arrangement, form a gap.

33. A calender roll comprising:

a roll jacket surrounding an inner chamber;

at least one actuator provided within said inner chamber structured and arranged to create a mechanical oscillation to act upon said roll jacket; and a speedometer.

34. A calender roll comprising:

a roll jacket surrounding an inner chamber;

at least one actuator provided within said inner chamber structured and arranged to create a mechanical oscillation to act upon said roll jacket; and a signal processor to gather information with respect to the rotational angle of said calender roll.

* * * * *